(12) United States Patent
Lim

(10) Patent No.: US 8,808,887 B2
(45) Date of Patent: Aug. 19, 2014

(54) BATTERY PACK

(75) Inventor: Young-Bin Lim, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 13/067,251

(22) Filed: May 19, 2011

(65) Prior Publication Data

US 2012/0129030 A1    May 24, 2012

(30) Foreign Application Priority Data

Nov. 23, 2010    (KR) ........................ 10-2010-0116859

(51) Int. Cl.
*H01M 2/00* (2006.01)
*H01M 2/26* (2006.01)

(52) U.S. Cl.
USPC .............................. 429/65; 429/160; 429/161

(58) Field of Classification Search
None
See application file for complete search history.

(56) References Cited

U.S. PATENT DOCUMENTS

| | | | |
|---|---|---|---|
| 5,756,227 | A | 5/1998 | Suzuki et al. |
| 2009/0202897 | A1 | 8/2009 | Kim et al. |
| 2010/0072834 | A1 | 3/2010 | Crane |

FOREIGN PATENT DOCUMENTS

| | | |
|---|---|---|
| JP | 08-148187 A | 6/1996 |
| JP | 2009-277378 A | 11/2009 |
| KR | 10 2009-0000301 A | 1/2009 |
| KR | 10-2009-0000302 A | 1/2009 |
| KR | 10 2009-0048863 A | 5/2009 |
| KR | 10-2010-0011033 A | 2/2010 |
| KR | 10-2010-0029727 A | 3/2010 |

OTHER PUBLICATIONS

Machine translation of JP 08-148187, retrieved from <http://www19.ipdl.inpit.go.jp/PA1/cgi-bin/PA1DETAIL> on Feb. 12, 2013.*
Machine translation of KR 10-2009-0048863, retrived from <http://kposd.kipo.go.kr:8088/up/kpion/> on Feb. 11, 2013.*
Machine translation of KR 10-2007-0064259, retrieved from <http://kposd.kipo.go.kr:8088/up/kpion/> on Jul. 26, 2013.*
Korean Office Action in KR 10-2010-0116859, dated May 9, 2012 (LIM).
Korean Notice of Allowance Dated Nov. 30, 2012.

* cited by examiner

*Primary Examiner* — Cynthia K. Walls
(74) *Attorney, Agent, or Firm* — Lee & Morse, P.C.

(57) ABSTRACT

A battery module includes a plurality of battery cells aligned in one direction, each battery cell having electrode terminals, a bus bar coupling the electrode terminals, a terminal shielding unit covering the bus bar, the terminal shielding unit including an upper shielding unit and a lower shielding unit with at least one opening, a pair of first and second end plates arranged outside outermost battery cells, and at least one coupling member coupling the first and second end plates.

20 Claims, 5 Drawing Sheets

BATTERY PACK

BACKGROUND

1. Field

Example embodiments relate to a battery module with a plurality of battery cells and to a battery pack including the battery module in a housing.

2. Description of the Related Art

In general, a battery cell may be used as an energy source of a mobile apparatus, e.g., an electric vehicle, a hybrid vehicle, etc., and a shape of the battery cell may vary in accordance with the kind of an applied external apparatus, e.g., the type of mobile apparatus. For example, a small mobile apparatus, e.g., a cellular phone, may be operated for a predetermined time with the output and capacity of a single battery cell. In another example, a large mobile apparatus, e.g., an electric vehicle and/or a hybrid vehicle with a large power consumption that are driven for a long time, may be operated with a battery module having a plurality of battery cells. The battery module may increase an output voltage or an output current in accordance with the number of built in battery cells.

SUMMARY

Example embodiments relate to a battery module. The battery module may include a plurality of battery cells aligned in one direction, each battery cell having electrode terminals, a bus bar coupling the electrode terminals, a terminal shielding unit covering the bus bar, the terminal shielding unit including an upper shielding unit and a lower shielding unit with at least one opening, a pair of first and second end plates arranged outside outermost battery cells, and at least one coupling member coupling the first and second end plates.

The opening of the lower shielding unit may include at least one hole.

The terminal shielding unit may overlap tops of the plurality of battery cells.

The lower shielding unit may surround the bus bar, the upper shielding unit covering the lower shielding unit and the bus bar.

The lower shielding unit may include first and second surfaces parallel to the alignment direction of the battery cells and facing each other, the at least one opening in the lower shielding unit including first and second openings in the first and second surfaces, respectively.

The first opening may be in a region between electrode terminals coupled by the bus bar, and the second opening may overlap the first opening.

The first opening may include first and second holes in regions corresponding to respective electrode terminals coupled by the bus bar, and the second opening is in a region between the first and second holes.

At least one of the first or second openings may include a plurality of holes.

A cooling medium may be configured to flow into the first opening and to be discharged out of the second opening, the bus bar being in a region between the first and second openings.

The coupling member may include two side coupling members along lateral side surfaces of the battery cells and a bottom coupling member along bottoms of the battery cells.

The at least one opening in the lower shielding unit may include first and second holes in opposite sidewalls of the lower shielding unit, the bus bar being in a region between the first and second sidewalls.

The terminal shielding unit may separate between adjacent bus bars, the terminal shielding unit including first and second holes facing each other.

Example embodiments relate to a battery pack. The battery pack may include a housing, the housing including at least one through hole, and at least one battery module in the housing, the battery module including a plurality of battery cells aligned in one direction, each battery cell having electrode terminals, a bus bar coupling the electrode terminals, a terminal shielding unit covering the bus bar, the terminal shielding unit including an upper shielding unit and a lower shielding unit with at least one opening, a pair of first and second end plates arranged outside outermost battery cells, and at least one coupling member coupling the first and second end plates.

The housing may accommodate a plurality of battery modules, the plurality of battery modules being aligned to have sides of the battery cells face each other.

The through hole in the housing may include first and second through holes, the first and second through holes being configured as inlet and outlet of a cooling medium.

The first and second through holes may be in opposite sidewalls of the housing, the first through hole facing a lateral side surface of the battery module.

The first or second through holes may face the opening of the lower shielding unit.

The first through hole, the second through hole, and the at least one opening in the lower shielding unit may be in fluid communication.

The first and second through holes may be on opposite ends of the battery module, the opposite ends corresponding to the first and second end plates.

A fluid communication path between the first and second through holes may overlap the bus bar.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
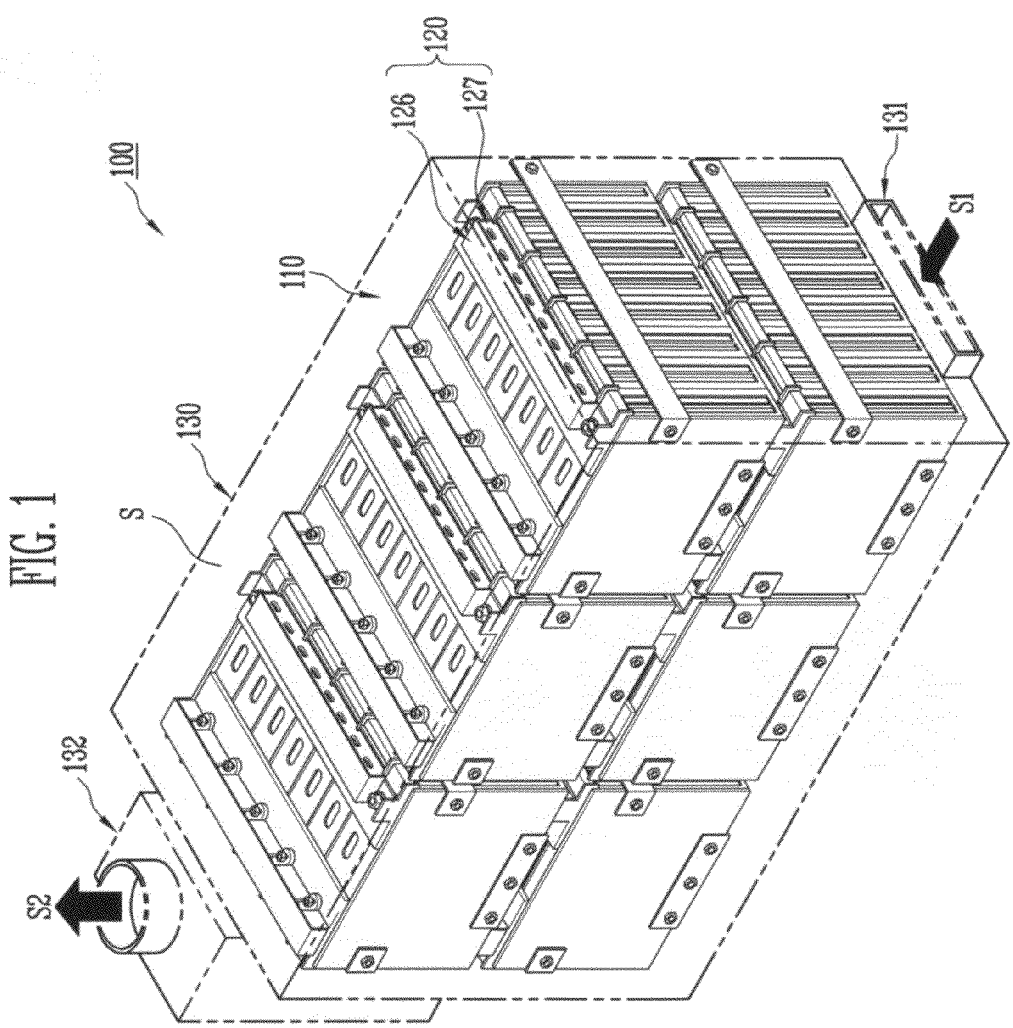
FIG. 1 illustrates a perspective view of a battery pack according to an exemplary embodiment.

Korean Patent Application No. 10-2010-0116859, filed on Nov. 23, 2010, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Further, it will also be understood that when a layer is referred to as being "coupled to" another layer, the layer may be directly coupled, e.g., electrically, to the other layer, or intervening layer may also be present.

Figure 2:
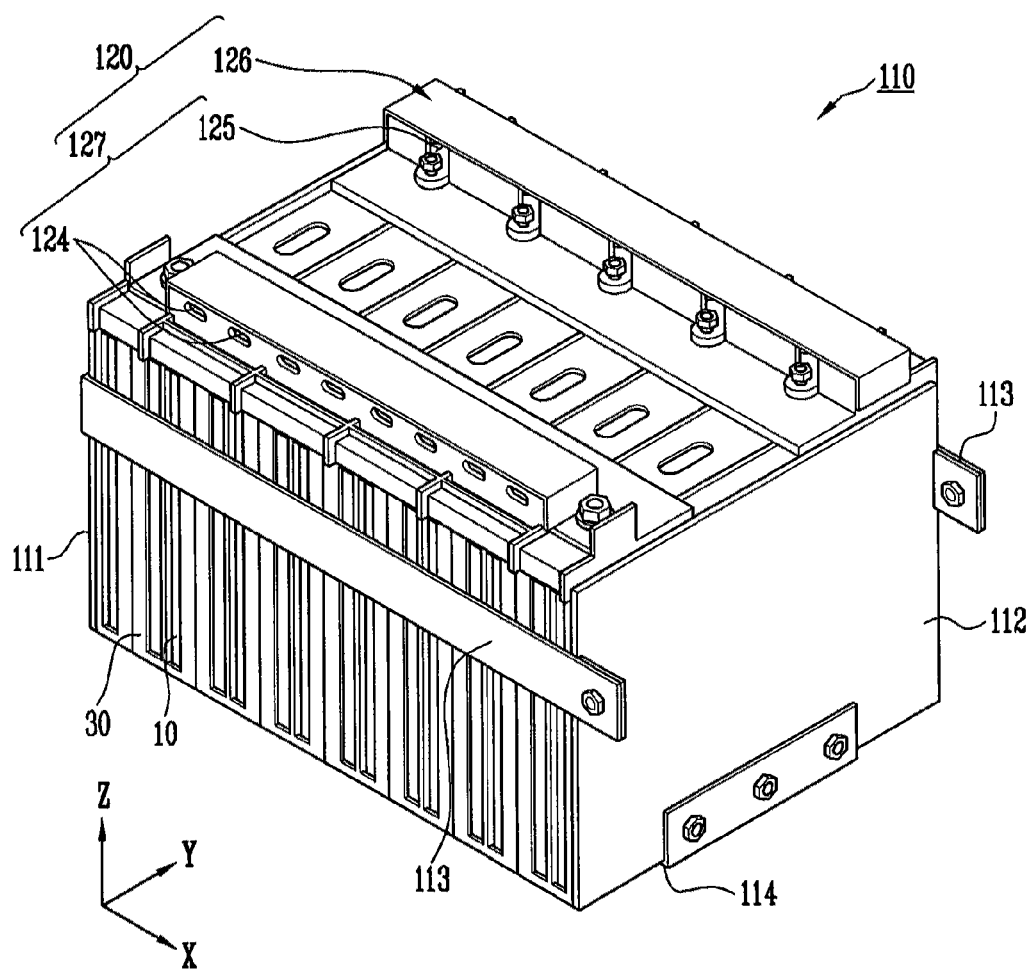
FIG. 2 illustrates a perspective view of a battery module included in the battery pack of FIG. 1.
Figure 3:
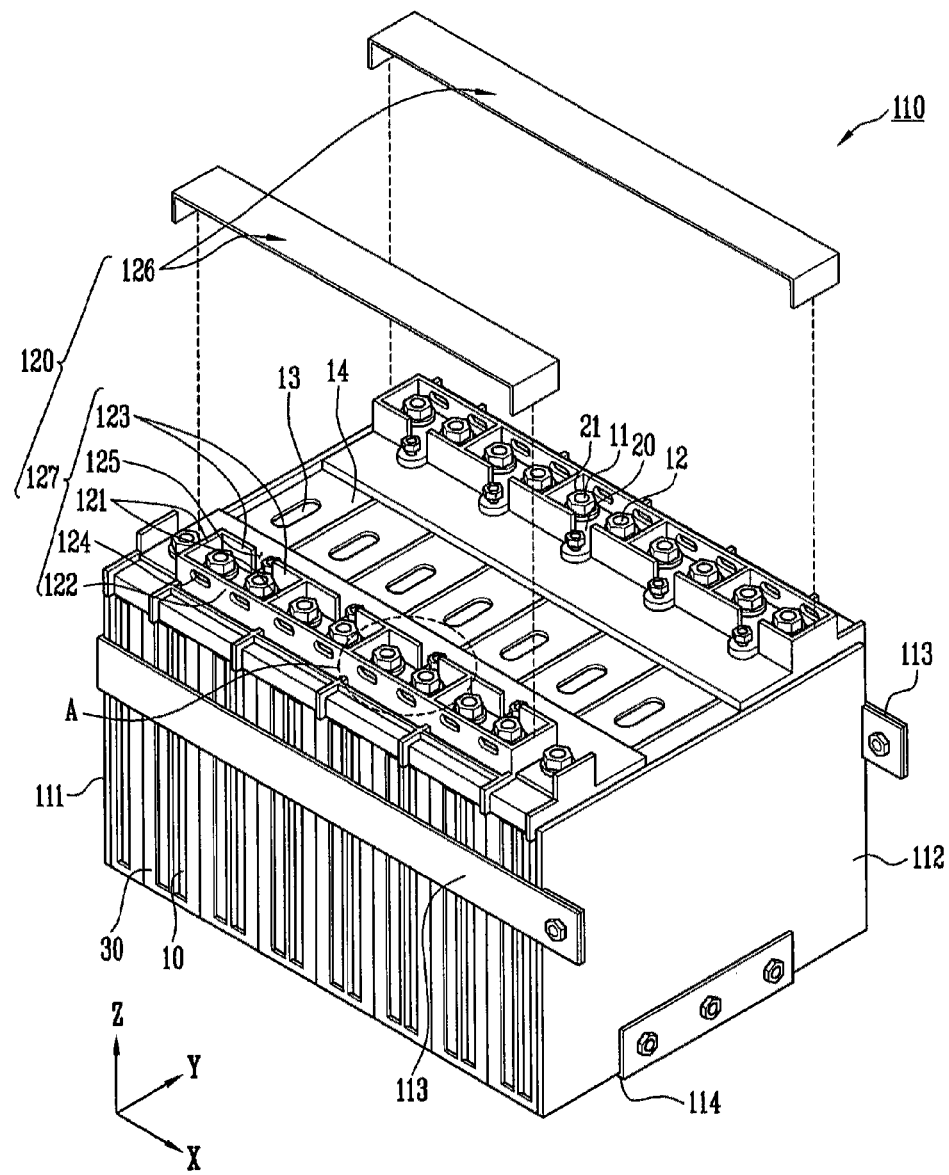
FIG. 3 illustrates an exploded view of the battery module in FIG. 2.

FIG. 1 is a view of a battery pack according to an exemplary embodiment. FIG. 2 is a view of a battery module included in the battery pack of FIG. 1. FIG. 3 is an exploded view of the battery module in FIG. 2.

Referring to FIG. 1, a battery pack 100 may include a plurality of battery modules 110 connected to each other and accommodated in a housing 130. As illustrated in FIGS. 2-3, the battery module 110 may include a plurality of battery cells 10 with first and second terminals 11 and 12, bus bars 20 for coupling the electrode terminals 11 and 12 of adjacent battery cells 10, terminal shielding units 120 for covering the bus bars 20, a pair of first and second end plates 111 and 112 arranged outside the battery cells 10, and at least one coupling members 113 and 114 for coupling first and second end plates 111 and 112. In addition, in the battery module 110, the terminal shielding unit 120 may include an upper shielding unit 126 and a lower shielding unit 127. The lower shielding unit 127 may include at least one first opening 124 and at least one second opening 125.

In detail, referring to FIG. 1, the housing 130 may include at least a first through hole 131 and a second through hole 132. The housing 130 may cover the plurality of battery modules 110, and the plurality of battery modules 110 may be aligned so that the side surfaces of the battery cells 10 face each other.

In further detail, referring to FIGS. 2 and 3, the battery module 110 may include a plurality of battery cells 10 aligned in one direction, and each battery cell 10 may have first and second electrode terminals 11 and 12, e.g., positive and negative electrode terminals 11 and 12. The battery cells 10 may be aligned so that the large surfaces of the adjacent battery cells 10 face each other.

The battery cells 10 of the battery module 110 may be manufactured by accommodating a separator between a positive electrode plate and a negative electrode plate to form an electrode assembly. The electrode assembly and an electrolyte may be sealed up in a battery case using a cap plate 14. Electrode terminals that are a positive electrode 11 coupled to the positive electrode plate and the negative terminal 12 coupled to the negative electrode plate may be provided to protrude through the cap plate 14. The positive electrode plate and the negative electrode plate may generate electro-chemical energy in reaction to the electrolyte. The energy generated at this time is transmitted to the outside through the positive terminal 11 and the negative terminal 12. In addition, a vent 13 may be provided between the positive terminal 11 and the negative terminal 12 to function as a path of discharging a gas.

According to the present embodiment, the battery cell 10 is a lithium ion secondary polygonal battery. Example embodiments, however, are not limited to the above. Various batteries, e.g., a lithium polymer battery and a cylindrical battery, may be applied to example embodiments.

The battery module 110 may include the plurality of battery cells 10, the pair of first and second end plates 111 and 112 separated from each other, and coupling members 113 and 114 for coupling the first and second end plates 111 and 112. The first and second end plates 111 and 112 may surface contact outermost battery cells 10 on opposing sides of the battery module 110 to press the plurality of battery cells 10 therebetween. The coupling members 113 and 114 may be coupled to the first and second end plates 111 and 112. One end of each of the coupling members 113 and 114 may be fastened to the first end plate 111 and the other ends of each of the coupling members 113 and 114 may be fastened to the second end plate 112. For example, the first and second end plates 111 and 112 and the coupling members 113 and 114 may be fastened by fastening members, e.g., a bolt and a nut.

In addition, the coupling members 113 and 114 couple the first and second end plates 111 and 112 to provide a space in which the plurality of battery cells 10 may be aligned and to support surfaces, e.g., side surfaces and bottom surfaces, of the battery cells 10. For example, as illustrated in FIG. 2, two coupling members 113 may be positioned to support opposing side surfaces, i.e., lateral surfaces, of the battery cells 10, and one coupling member 114 may be positioned to support bottom surfaces of the battery cells 10. The positions and shapes of the coupling members 113 and 114 may vary with the design of the battery module 110.

In the space partitioned off by the first and second end plate 111 and 112, the side surface coupling member 113, and the bottom surface coupling member 114, the battery cells 10 may be fixed to each other. Therefore, the battery cells 10 may not vibrate, e.g., due to an external shock.

In addition, a barrier 30 may be interposed between, e.g., adjacent, battery cells 10. A spacer (not shown) may be provided in the barrier 30 to separate the plurality of adjacent battery cells 10 and to form a space between the battery cells 10, so that the spacer may provide a movement path for a cooling medium for cooling the battery cells 10.

Referring to FIG. 1, as discussed previously, the housing 130 may include first and second through holes 131 and 132. Hereinafter, the first through hole 131 may be referred to as an inlet 131 and may be used interchangeably therewith. Also, hereinafter, the second through hole 132 may be referred to as an outlet 132 and may be used interchangeably therewith. A cooling medium may enter the housing 130 through the inlet 131 and may be discharged through the outlet 132. For example, the cooling medium may be received through the inlet 131, i.e., via a first path S1, may be accommodated in the housing 130 to cool at least one battery module 110, and may be discharged through the outlet 132, i.e., via a second path S2.

In detail, the battery cells 10 may generate heat while performing charge and discharge operations a plurality of times. Therefore, according to example embodiments, the cooling medium for cooling the battery cells 10 may be provided in the battery pack 100 having at least one battery module 110 with at least one battery cell 10, so the generated heat may be removed, i.e., an overall temperature of the battery cells 10 may decrease, and stability of the battery cells 10 may improve.

The inlet 131 that is the first through hole 131 and the outlet 132 that is the second through hole 132 provided in the housing 130 may be used as first and second paths S1 and S2 through which the cooling medium for cooling the battery cells 10 moves. For example, in order to increase the cooling efficiency of the cooling medium, a channel may be formed in a space sealed up by the housing 130. For example, the channel of the cooling medium may be determined by the inlet 131 and the outlet 132, e.g., extend within the housing 130 between the inlet 131 and the outlet 132, through which the cooling medium is received in the housing 130. For example, the inlet 131 and the outlet 132 may be provided on opposite sides of the housing 130 to face each other, e.g., the inlet 131 may face a lateral side surface of the battery module 110.

The inlet 131 is a part through which the cooling medium is received via the first path S1, so the temperature of the cooling medium received in the inlet 131 may be the lowest. Therefore, in the battery module 110, the side surface of the battery module 110 in which the exposed region of the battery cell 10 is relatively large may face the inlet 131, i.e., the inlet may face a largest surface of the battery module 110. In addition, the outlet 132 is a part through which the cooling medium is discharged via the second path S2, so the temperature of the cooling medium at the outlet 132 may be higher than the temperature at the inlet 131 due to thermal exchange with the battery module 110.

As described above, the barrier 30 may be provided between the battery cells 10 aligned in one direction, so the space formed by the barrier 30 may form the channel for the cooling medium. The cooling medium may flow through the channel defined by the barrier 30, i.e., through the space defined between the barrier 30 and the battery cell 10, to contact the large surface of the battery cell 10 and to perform thermal exchange. For example, the barrier 30 may extend to a predetermined thickness along the y-axis relative to the battery cells 10, so the thickness may define a space S for the cooling medium to contact the battery cells 10. Therefore, the cooling medium may enter the housing 130 through the inlet 131 along the first path S1, may spread in the housing 130 to contact the battery cells 10 via the space defined by the barrier 30, and may be discharged through the outlet 32 via the second path S2. For example, the inlet 131 may be spaced from the outlet 132 for the cooling medium to spread through the space S for cooling purposes. The cooling medium may be discharged in the opposite direction to the receiving direction.

Referring to FIGS. 2 and 3, the battery module 110 may further include the terminal shielding unit 120. The terminal shielding unit 120 may include the upper shielding unit 126 and the lower shielding unit 127, and the lower shielding unit 127 may include the at least first and second openings 124 and 125. The terminal shielding unit 120 may prevent a short between adjacent bus bars 20 and/or between a bus bar 20 and an electric conductor formed of metal, e.g., a bolt or a nut, that is a material of the battery module 110.

In detail, as illustrated in FIG. 3, the lower shielding unit 127 may include an accommodating unit in which the bus bars 20 are provided, e.g., the lower shielding unit 127 may frame a plurality of bus bars 20, and the upper shielding unit 126 may be provided to cover the lower shielding unit 127. For example, if the bus bars 20 extend along the first direction, e.g., along the x-axis, the lower shielding unit 127 may extend along the first direction and may include partitions along a second direction, e.g., along the y-axis, between, e.g., adjacent, bus bars 20. The lower shielding unit 127 may further include the first and second openings 124 and 125 that form a channel of the cooling medium for cooling the bus bars 20. The bus bar 20 as an electrical conductor, e.g., nickel, for electrically coupling the positive terminal 11 and the negative terminal 12 of adjacent battery cells 10 may be fixed to the positive and negative terminals 11 and 12 using a member, e.g., a nut 21.

Figure 4:
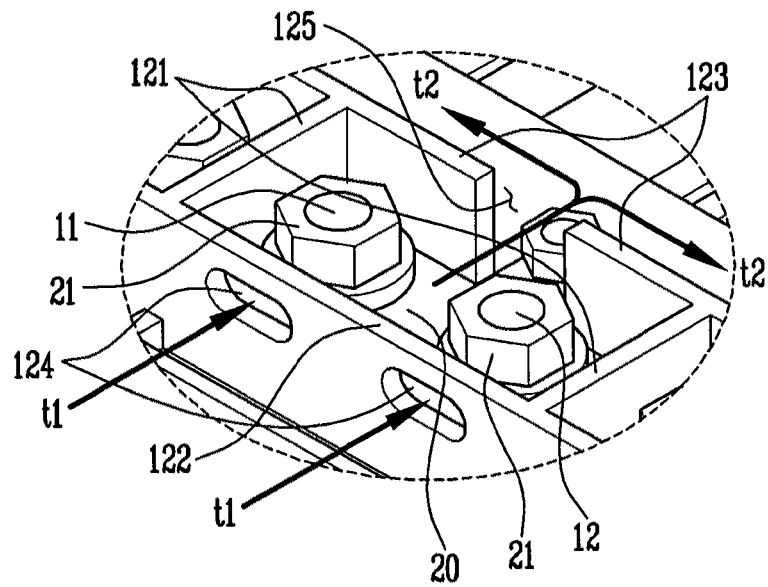
FIG. 4 illustrates an enlarged view of part A of FIG. 3.

A detailed description of the lower shielding unit 127 will be provided with reference to FIG. 4. FIG. 4 is an enlarged view of part A of FIG. 3.

Referring to FIG. 4, the lower shielding unit 127 may include the first and second openings 124 and 125. For example, the first and second openings 124 and 125 may be in the form of holes.

In the battery module 110, the terminal shielding unit 120 may have an integrated structure on the tops of the plurality of battery cells 10 and may cover the plurality of bus bars 20. The terminal shielding unit 120 may be integrally formed, e.g., the upper and lower shielding units 126 and 127 may be integrally formed, so that the battery module 110 may be simply manufactured and process efficiency may be improved. In addition, the mechanical strength of the integrated terminal shielding unit 120 may be increased so that the bus bars 20 may be firmly protected.

In detail, as illustrated in FIG. 4, the lower shielding unit 127 may include a plurality of barrier ribs 121 along the second direction, e.g., along the y-axis, between adjacent bus bars 20, and first and second surfaces 122 and 123 along the first direction, e.g., along the x-axis, for coupling the barrier ribs 121. The barrier ribs 121 of the lower shielding unit 127 may partition off adjacent bus bars 20 to prevent a short therebetween. The first and second surfaces 122 and 123 may be parallel with an alignment direction of the battery cells 10, and the first surface 122 and the second surface 123 may face each other, e.g., the second surface 123 may be provided inside the first surface 122. In addition, the first and second surfaces 122 and 123 may include the first and second openings 124 and 125, respectively. For example, the barrier ribs 121 and the first and second surfaces 122 and 123 may be formed integrally. In another example, since the barrier ribs 121 partition the bus bars 20, the barrier ribs 121 may be provided in the upper shielding unit 126.

In addition, the lower shielding unit 127 may be provided to include the region in which the electrode terminals 11 and 12 of the battery cell 10 are provided. That is, the lower shielding unit 127 may correspond to the electrode terminals 11 and 12 included on both ends of the battery cell 10, i.e., along both sides of the battery module 110, so the lower shielding unit 127 may be provided on each side of the battery module 110, i.e., on the right and left of the top surface of the battery module 110. The lower shielding unit 127 provided on the right and left of the battery module 110 may be symmetrical with each other. In the lower shielding unit 127, the first surface 122 faces an external side of the battery module 110 and the second surface 123 faces a region corresponding to a center of a top surface of the battery module 110.

The at least one first opening 124 may be formed in the first surface 122 of the lower shielding unit 127, and may correspond to an electrode terminal of the battery cell 10. For example, the first opening 124 may be provided to correspond to a region between the electrode terminals 11 and 12 or one first opening 124 may be formed to correspond to each of the electrode terminals 11 and 12 coupled by the bus bar 20. The at least one second opening 125 may be formed in the second surface 123 of the lower shielding unit 127 to face the first opening 124, e.g., the second opening 125 may be positioned between the electrode terminals 11 and 12 coupled by the bus bar 20 to face the first opening 124.

Conventionally, as a battery cell repeatedly performs charge and discharge, heat is generated by the battery cell and a bus bar on which the flow of current is concentrated. In addition, as the heat generated by the bus bar increases, the resistance of the bus bar increases, so that the flow of current may be prohibited. Therefore, according to example embodiments, the battery module 110 may include the terminal shielding unit 120 with openings, so the bus bar 20 may be cooled to improve the performance of the battery module 110.

That is, in the battery pack 100 according to the example embodiments, the bus bars 20 may be effectively cooled through the terminal shielding unit 120 without using a separate structural component for the cooling medium.

That is, the cooling medium may flow along path t1 into the lower shielding unit 127 through the first opening 124, and the cooling medium may be discharged along path t2 out of the shielding unit through the second opening 125. Therefore, the bus bar 20 may be cooled, i.e., when the cooling medium flows from the first opening 124 to the second opening 125, without requiring an additional structure of a path for the cooling medium in the battery pack 100. The paths t1 and t2 may also be referred to as refrigerant moving channels t1 and t2, and may be used interchangeably therewith. The paths t1 and t2 may be formed in the lower shielding unit 127, so that the bus bar 20 may be cooled. That is, the first openings 124 may be set to face the movement direction of the cooling medium used for cooling the battery cell 10, so that the bus bar 20 may be cooled by the battery cell 10 cooling refrigerant.

In detail, in the battery pack 100, the inlet 131 or the outlet 132 of the housing 130 may be provided to face the first or second opening 124 or 125 of the lower shielding unit 127. For example, the battery module 110 may be arranged in the battery pack 100, so the inlet 131 of the housing 130 may face the first openings 124 in the battery module 110. As such, the cooling refrigerant may enter the inlet 131 of the housing 130 along the first path S1 into the channel, i.e., space, defined by the barrier 30 between the battery cells 10, and may flow through the first openings 124 of the lower shielding unit 127 along path t1 toward the second openings 125 to cool the bus bar 20. The cooling refrigerant may be discharged through path t2 to flow towards the outlet 132. That is, the cooling refrigerant, i.e., cooling medium, discharged through the second opening 125 via the path t2 may form a channel toward the first or second end plate 111 or 112. The channel toward the first or second end plate 111 or 112 may extend to the outlet 132 of the housing 130 to be discharged outside the battery pack 100 via the second path S2.

In addition, the first openings 124 may be provided to correspond to a pair of electrode terminals 11 and 12 that belong to the accommodating unit that is a region partitioned off by the barrier ribs 121. At this time, the size of the first opening 124 may be smaller than members that are electric conductors, e.g., bolts or nuts, used for manufacturing the battery pack 100. Therefore, the electric conductors that may be generated do not penetrate the lower shielding unit 127. In addition, since a low temperature air may be used as the cooling medium and the air does not affect the size of the openings 124 and 125, when the first or second opening 124 or 125 has a small size, the cooling medium may be easily received or discharged from the lower shielding unit 127.

For example, as illustrated in FIG. 4, the cooling medium may be received in the battery module 110 through two first openings 124 corresponding to the electrode terminals 11 and 12, thereby effectively cooling the bus bar 20 for coupling the electrode terminals 11 and 12. In addition, the cooling medium received through the two first openings 124 may be discharged through the second opening 125 provided between the two first openings 124. The part where the cooling medium is received, e.g., an area of two first openings 124, may be smaller than the part where the cooling medium is discharged, e.g., an area of one second opening 125. Therefore, the cooling medium may stay for a long time in the lower shielding unit 127, i.e., in a region overlapping the bus bar 20, thereby cooling the bus bar 20. The cooling medium whose temperature increased due to thermal exchange with the bus bar 20 may be discharged through the second opening 125.

According to the example embodiments, the housing 130 having the inlet 131 and the outlet 132 may be formed to form the battery pack 110, so that the cooling medium may be effectively used. However, example embodiments are not limited to the above. That is, regardless of the housing 130, the plurality of battery modules 110 may be arranged to contact the cooling medium so that the battery cells 10 may be easily cooled.

The size and shape of the first and second openings 124 and 125 included in the lower shielding unit 127 may be changed in accordance with the speed and temperature of the cooling medium in the battery pack 100.

Figure 5:
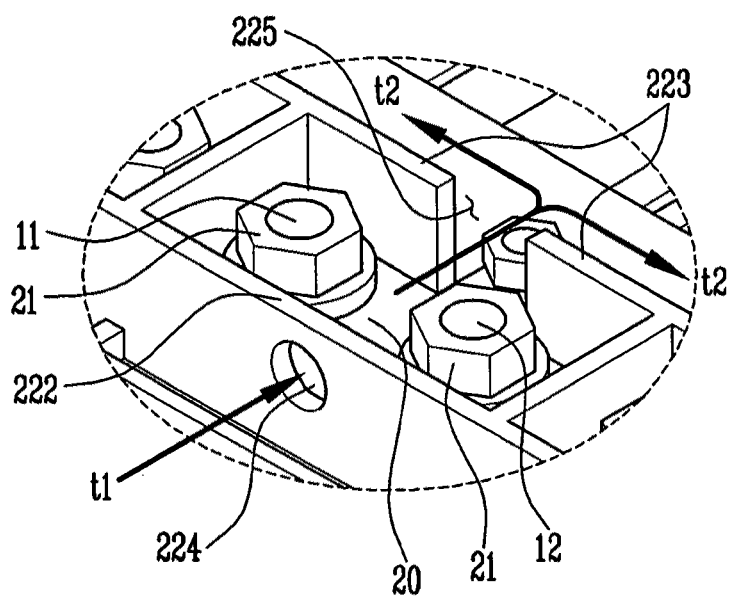
FIG. 5 illustrates a view of a terminal shielding unit according to another example embodiment.
Figure 6:
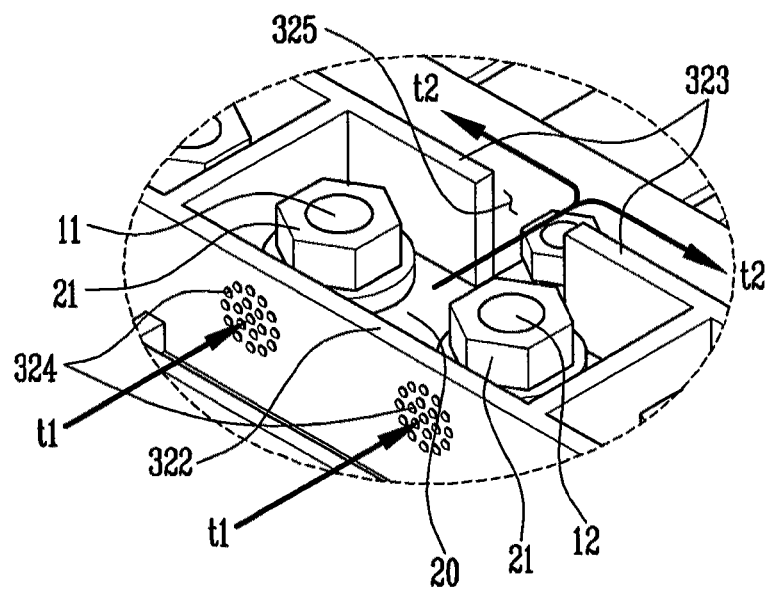
FIG. 6 illustrates a view of a terminal shielding unit according to still another example embodiment.

FIGS. 5 and 6 illustrate a battery pack according to other aspects of the example embodiments. Since FIGS. 5 and 6 have similar structures and functions as those described previously with reference to FIGS. 1 to 4, detailed descriptions of same elements will not be repeated.

Referring to FIG. 5, the lower shielding unit according to the example embodiments may include at least one first opening 224 in the first surface 222 and at least one second opening 225 in the second surface 223 that form the channel for the cooling medium that cools the bus bars 20. The first opening 224 may be provided between the electrode terminals 11 and 12 coupled by the bus bar 20, and the second opening 225 may be provided to face the first opening 224. That is, the first opening 224 may be provided to face the center of the bus bar 20 for coupling the pair of electrode terminals 11 and 12, so that the cooling medium received through the first opening 224 may be directly transmitted to the center of the bus bar 20 to effectively cool the bus bar 20. In addition, since the first opening 224 may face, e.g., completely overlap in the direction of flow, the second opening 225, the cooling medium circulation may be faster, e.g., as compared to circulation in FIG. 4, thereby improving cooling efficiency.

Referring to FIG. 6, the lower shielding unit according to example embodiments may include a plurality of first openings 324 in the first surface 321 and at least one second opening 325 in the second surface 323 for forming the channel of the cooling medium for cooling the bus bar 20. The first openings 324 may be provided in positions corresponding to the pair of electrode terminals 11 and 12 in the region partitioned off by the terminal shielding unit, and the second opening 325 may be provided to face the first openings 324 between the electrode terminals 11 and 12. The plurality of holes may be realized as a plurality of holes in the area corresponding to the electrode terminals 11 and 12. The first opening 324 realized by the plurality of holes may be included in two separated regions. The cooling medium may be received through the plurality of holes 324 in the separated region to cool the bus bar 20. The first openings 324 may increase the speed of the cooling medium and may form a vortex to effectively cool the bus bar 20. In addition, since the first openings 324 have a small size, it may be possible to block induction of foreign substances during processes and to improve the mechanical strength of the terminal shielding unit.

Example embodiments provide a battery pack having improved cooling characteristic capable of cooling bus bars without including an additional member. Therefore, the battery cell may have improved life span without deteriorating due to a large number of charge/discharge. Further, as an additional member for cooling the bus bars may not be required, the battery pack may have an improved, e.g., smooth, flow of current.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A battery module, comprising:
   a plurality of battery cells aligned in one direction, each battery cell having electrode terminals;
   a bus bar coupling the electrode terminals;
   a terminal shielding unit covering the bus bar, the terminal shielding unit including:
      an upper shielding unit above and spaced apart from tops of the electrode terminals, and
      a lower shielding unit having at least two openings facing each other, at least one of the two openings being in a region between electrode terminals coupled by the bus bar, the two openings defining a fluid communication path from a first exterior side of the terminal shielding unit to a second exterior side of the terminal shielding unit, and the fluid communication path overlapping a center of the bus bar inside the terminal shielding unit;
   a pair of first and second end plates arranged outside outermost battery cells; and
   at least one coupling member coupling the first and second end plates.

2. The battery module as claimed in claim 1, wherein the terminal shielding unit covers a plurality of bus bars, each bus bar corresponding to the at least two openings of the lower shielding unit.

3. The battery module as claimed in claim 1, wherein the upper shielding unit of the terminal shielding unit overlaps tops of the plurality of battery cells, the lower shielding unit facing an exterior of the battery module.

4. The battery module as claimed in claim 1, wherein the lower shielding unit surrounds the bus bar, the upper shielding unit covering the lower shielding unit and the bus bar.

5. The battery module as claimed in claim 4, wherein the lower shielding unit includes first and second surfaces parallel to the alignment direction of the battery cells and facing each other, the at least two openings in the lower shielding unit being in the first and second surfaces, respectively.

6. The battery module as claimed in claim 5, wherein a first opening of the at least two openings is in the region between electrode terminals coupled by the bus bar, and a second opening of the at least two openings overlaps the first opening.

7. The battery module as claimed in claim 5, wherein a first opening of the at least two openings includes first and second holes in regions corresponding to respective electrode terminals coupled by the bus bar, and a second opening of the at least two openings is in the region between the first and second holes.

8. The battery module as claimed in claim 5, wherein at least one of the two openings includes a plurality of holes.

9. The battery module as claimed in claim 5, further comprising a space for a cooling medium to flow into a first opening of the at least two openings and to be discharged out of a second opening of the at least two openings, the bus bar being in a region between the first and second openings.

10. The battery module as claimed in claim 1, wherein the coupling member includes two side coupling members along lateral side surfaces of the battery cells and a bottom coupling member along bottoms of the battery cells.

11. The battery module as claimed in claim 1, wherein the bus bar is in a region between the at least two openings, a portion of the lower shielding unit continuously surrounding three sides of the bus bar.

12. The battery module as claimed in claim 1, wherein the terminal shielding unit separates between adjacent bus bars, the terminal shielding unit including first and second holes facing each other.

13. A battery pack, comprising:
   a housing, the housing including at least one through hole; and
   at least one battery module in the housing, the at least one battery module including:
      a plurality of battery cells aligned in one direction, each battery cell having electrode terminals,
      a bus bar coupling the electrode terminals,
      a terminal shielding unit covering the bus bar, the terminal shielding unit including:
         an upper shielding unit above and spaced apart from tops of the electrode terminals, and
         a lower shielding unit having at least two openings facing each other, at least one of the two openings being in a region between electrode terminals coupled by the bus bar, the two openings defining a fluid communication path from a first exterior side of the terminal shielding unit to a second exterior side of the terminal shielding unit, and the fluid communication path overlapping a center of the bus bar inside the terminal shielding unit,
      a pair of first and second end plates arranged outside outermost battery cells, and
      at least one coupling member coupling the first and second end plates.

14. The battery pack as claimed in claim 13, wherein the housing accommodates a plurality of battery modules, the plurality of battery modules being aligned to have sides of the battery cells face each other.

15. The battery pack as claimed in claim 13, wherein the through hole in the housing includes first and second through holes, the first and second through holes being configured as inlet and outlet of a cooling medium.

16. The battery pack as claimed in claim 15, wherein the first and second through holes are in opposite sidewalls of the housing, the first through hole facing a lateral side surface of the battery module.

17. The battery pack as claimed in claim 15, wherein the first or second through holes faces the opening of the lower shielding unit.

18. The battery pack as claimed in claim 15, wherein the first through hole, the second through hole, and the at least one opening in the lower shielding unit are in fluid communication.

19. The battery pack as claimed in claim 18, wherein the first and second through holes are on opposite ends of the battery module, the opposite ends corresponding to the first and second end plates.

20. The battery module as claimed in claim 1, wherein a first opening of the at least two openings is in the region between electrode terminals coupled by the bus bar, at least one second opening facing the first openings and defining an entrance of the fluid communication path, and a total area of the first opening being larger than a total area of the at least one second opening.

* * * * *